United States Patent
Mehta et al.

(10) Patent No.: US 12,299,079 B2
(45) Date of Patent: May 13, 2025

(54) COST EQUALIZATION SPECTRAL CLUSTERING

(71) Applicant: FUJITSU LIMITED, Kawasaki (JP)

(72) Inventors: Himanshi Mehta, West Lafayette, IN (US); Sarvagya Upadhyay, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 519 days.

(21) Appl. No.: 17/699,399

(22) Filed: Mar. 21, 2022

(65) Prior Publication Data

US 2023/0297651 A1   Sep. 21, 2023

(51) Int. Cl.
| | |
|---|---|
| *G06K 9/62* | (2022.01) |
| *G06F 7/24* | (2006.01) |
| *G06F 18/23213* | (2023.01) |
| *G06F 18/2323* | (2023.01) |

(52) U.S. Cl.
CPC ............ *G06F 18/2323* (2023.01); *G06F 7/24* (2013.01); *G06F 18/23213* (2023.01)

(58) Field of Classification Search
None
See application file for complete search history.

(56) References Cited

U.S. PATENT DOCUMENTS

| | | | |
|---|---|---|---|
| 2019/0102155 A1* | 4/2019 | Garvey | G06F 8/60 |
| 2020/0142875 A1* | 5/2020 | Cao | G06F 16/27 |
| 2021/0065031 A1* | 3/2021 | Parikh | G06Q 50/60 |

OTHER PUBLICATIONS

Fortuato, "Community detection in graphs" Jan. 25, 2010 (Year: 2010).*
European Search Report dated Jul. 17, 2023 as received in application No. 23159588.5.
Fortunato, "Community detection in graphs" Jan. 25, 2010.
Santo Fortunato: "Community detection in graphs", arxiv.org, Cornell University Library, Jun. 3, 2009.
European Search Report issued in corresponding application No. 23159588.5, dated Jul. 17, 2023.
M. Kleindessner et al., "Guarantees for spectral clustering with fairness constraints" [KSAM19] International Conference on Machine Learning (Jan. 24, 2019).

(Continued)

*Primary Examiner* — Andrew H Lam
(74) *Attorney, Agent, or Firm* — Maschoff Brennan (57) ABSTRACT

A method may include obtaining a graph dataset that includes a plurality of nodes. The method may include specifying two or more clusters into which each node of the plurality of nodes is to be sorted. The method may include assigning each respective node of the plurality of nodes of the graph dataset into a respective cluster of the two or more clusters according to respective costs that are each associated with each of the respective clusters such that all of the costs are within a threshold value of each other. The respective cost associated with its respective cluster may be determined based on a number of external edges connecting the respective nodes in the respective cluster to the nodes in each other cluster. The method may include analyzing the plurality of nodes with respect to the respective cluster to which each of the respective nodes is assigned.

20 Claims, 5 Drawing Sheets

(56) References Cited

OTHER PUBLICATIONS

M. Ghadiri et al., "Socially fair k-means clustering" Conference on Fairness, Accountability, and Transparency (2021) [GSV21] Jun. 17, 2020.
Y. Makarychev and A. Vakilian, "Approximation algorithms for socially fair clustering" [MV21] Conference on Learning Theory (Mar. 3, 2021).
S. Bera et al., "Fair algorithms for clustering" [BCFN19] Advances in Neural Information Processing Systems (2019).
D. Goyal and R. Jaiswal, "FPT algorithm for socially fair clustering" [GJ21] arXiv e-Print: 2106.06755, Jun. 12, 2021.

* cited by examiner

COST EQUALIZATION SPECTRAL CLUSTERING

The present disclosure generally relates cost equalization spectral clustering.

BACKGROUND

Data points may be presented as multiple nodes included in a dataset referred to as a graph. Nodes included in the graph dataset may be grouped together according to similarities and differences between the nodes. Machine learning models may be trained to classify the nodes into one or more groups according to a given data analysis task or goal.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a graph dataset that includes a plurality of nodes. The method may include specifying two or more clusters into which each node of the plurality of nodes is to be sorted. The method may also include assigning each respective node of the plurality of nodes of the graph dataset into a respective cluster of the two or more clusters according to respective costs that are each associated with each of the respective clusters such that all of the costs are within a threshold value of each other. The respective cost associated with its respective cluster may be determined based on a number of external edges connecting the respective nodes in the respective cluster to the nodes in each other cluster. The method may additionally include analyzing the plurality of nodes with respect to the respective cluster to which each of the respective nodes is assigned.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Unsupervised learning models may be trained and configured to identify multiple clusters into which data points of a given dataset may be sorted and to bucket the data points into the identified clusters. Such data categorization processes may facilitate identification of relationships and similarities between data points. For example, data points relating to gene sequences may be clustered based on similarities in gene expressions. As another example, data points relating to customer profiles may be clustered based on similarities between marketing preferences. The data points may be sorted using a variety of clustering methods such as linkage-based clustering algorithms (analyzing distances between data points), cost-minimization clustering algorithms (e.g., k-means clustering), or similarity-based spectral clustering algorithms.

However, sorting data points according to existing clustering algorithms may lead to unintended consequences in which the clustering does not accurately provide a target result. For example, such clustering algorithms may sort certain types of data in a manner that does not equitably represent different groups of people. For instance, because existing clustering algorithms may focus on optimally clustering data points according to one or more sorting criteria, disparities may exist between groups of clustered data points. For example, a majority of data points of a given dataset may be grouped into a first cluster, and the remaining data points of the given dataset may be grouped between a second cluster and a third cluster. In these and other examples, the first cluster may be disproportionately represented based on the algorithm by which the data points are sorted, and a learning model (e.g., a machine learning model) trained based on the clustered data points of the given dataset may learn a disproportionate bias towards the first cluster. As another example, some data points of a given graph dataset may be clustered towards the center of the graph in a first cluster, while other clusters are dispersed around the edges of the graph. In these and other examples, the first cluster may be represented as having a disproportionately lower cost (measured as distance to the center of the graph dataset) relative to the other clusters dispersed around the edges of the graph.

Consequently, a clustering process that accounts for overly represented data may provide more realistic and/or practical clustering results than existing clustering processes that focus on optimizing one or more characteristics of grouped data points. Additionally or alternatively, a such a clustering process may improve existing clustering processes by mitigating the effects of human operator biases in designing and/or implementing the existing clustering processes. Therefore, the improved clustering process may improve the training of machine learning models by generating better training data that may thus help reduce biases in the models, such as those that may be inequitable to minority groups.

The present disclosure relates to, among other things, spectral clustering of nodes of a graph dataset. In some embodiments, spectral clustering of the graph dataset according to at least one embodiment of the present disclosure may facilitate generating clusters of nodes that account for overrepresented data. In these and other embodiments, a cost associated with each of the clusters may be quantified to determine how well each of the clusters accounts for overrepresented data, and spectral clustering of the graph dataset according to the present disclosure may result in all or most of the clusters having the same or similar costs. In some embodiments, the cost may be determined based on a number of external edges connecting nodes in a given cluster with nodes included in other clusters. As such, spectral clustering according to the present disclosure may provide an improvement over existing clustering methods as described above.

Embodiments of the present disclosure are explained with reference to the accompanying figures.

Figure 1:
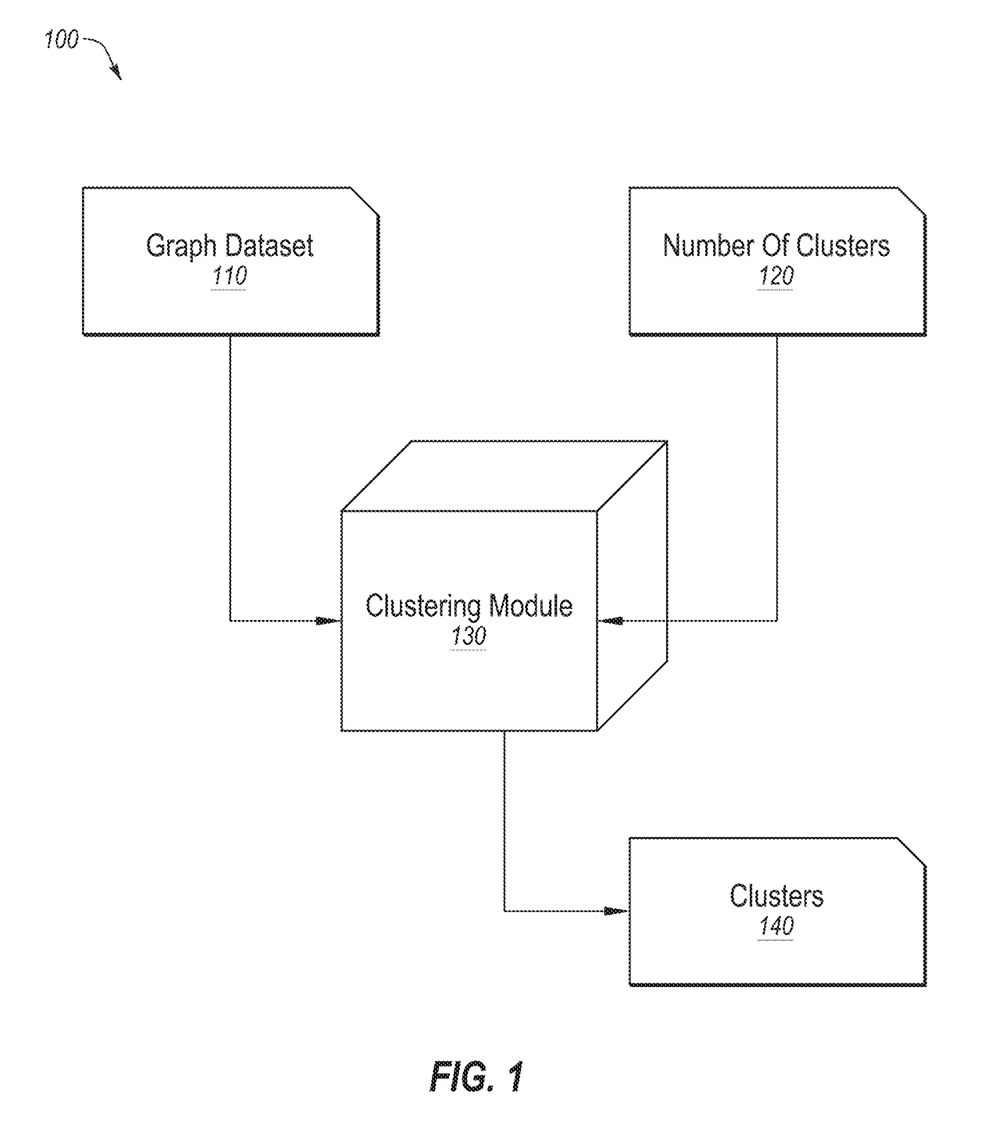
FIG. 1 is a diagram representing an example system of cost equalized spectral clustering according to at least one embodiment of the present disclosure.

FIG. 1 is a diagram representing an example system 100 of spectral clustering according to at least one embodiment of the present disclosure. The system 100 may include a clustering module 130 configured to obtain a graph dataset 110 and a number of clusters 120. The graph dataset 110 may represent data points as nodes in the graph dataset 110 and each pair of nodes in the graph dataset 110 may include a connection between the two nodes of the pair (referred to as an "edge"). As such, the graph dataset 110 may represent a set of data points and the relationships between the data points.

The graph dataset 110 may include a relational view of the data points, which may facilitate quantitative analysis of the data points and/or the overall dataset itself, such as by modeling the data points and/or relationships between the data points as one or more matrices. For example, the clustering module 130 may determine a degree of connectivity between data points (i.e., how many other nodes a given node is connected to) represented as a connectivity matrix that includes integer elements indicating the number of other nodes to which a given node is connected. As another example, the clustering module 130 may determine a degree of adjacency between data points (i.e., which data points are connected to which other data points by edges) represented as an adjacency matrix that includes binary elements indicating to which other nodes a given node is connected. As such, the graph dataset 110 may provide a networked representation of the data points, and one or more computing systems, such as the clustering module 130, may be configured to perform one or more data analysis approaches on the graph dataset 110 based on linear algebra and/or other quantitative operations relating to matrices.

In some embodiments, the clustering module 130 may determine how to cluster the nodes of the graph dataset 110 based on the number of clusters 120 such that each cluster 140 that includes the clustered nodes has the same or approximately the same cost based on the number of external edges extending from each of the clusters 140. In other words, the clustering module 130 may group each respective node into a respective cluster 140 such that the nodes are grouped into a number of clusters corresponding to the number of clusters 120. In these and other embodiments, the nodes of the graph dataset 110 may be grouped in the clusters 140 such that each of the clusters 140 includes approximately the same cost after each of the nodes of the graph dataset 110 has been assigned to a cluster 140. By clustering the nodes of the graph dataset 110 such that each cluster 140 includes the same or similar costs, the clustering module 130 may account for overly represented data points that other spectral clustering methods would fail to address. Further, as indicated above, clustering in such a manner may result in more cost equalized clustering by better representing data associated with underrepresented groups (e.g., minority groups).

In some embodiments, the number of clusters 120 may be set by a user analyzing the data based on parameters of the data analysis being performed. For example, the user may specify that nodes of a given graph dataset relating to New York City may be classified in five clusters in which each of the clusters represents a borough in the city.

Additionally or alternatively, the number of clusters 120 may be set or recommended to a user automatically by a machine learning model or any other data analysis software. A machine learning model may analyze the data analysis tasks associated with the graph dataset 110 and propose one or more ways in which the user may want to cluster the nodes and the number of clusters 120 corresponding to each way of clustering the nodes. For example, the machine learning model may propose a number of clusters 120 for a community detection analysis relating to a social media network. The social media network may represent an example of the graph dataset 110, and each user of the social media network may be represented as a node included in the graph dataset 110. Relationships between the users, such as being friends, having shared messages, or having interacted with social media content associated with a given user, may be represented as edges between the nodes. The machine learning model may propose a number of clusters 120 that corresponds to ethnicities (e.g., x clusters in which each cluster represents a different ethnicity), genders (e.g., x clusters in which each cluster represents a different gender), religious affiliations (e.g., x clusters in which each cluster represents a different religious affiliation), geographical neighborhoods (e.g., x clusters in which each cluster represents a different neighborhood of a given city), or any other characteristics of the users included in the social media network.

In some embodiments, the clustering module 130 may generate a Laplacian matrix based on a connectivity matrix representing the degree of connectivity between the nodes included in the graph dataset 110 and an adjacency matrix representing the degree of adjacency between the nodes included in the graph dataset 110. One or more eigenvalues and eigenvectors may be calculated based on a spectral decomposition of the Laplacian matrix (e.g., according to a trace function as described in further detail below). In some embodiments, the clustering module 130 may generate the clusters 140 by sorting each of the nodes of the graph dataset 110 into a respective cluster based on the two or more clusters as identified according to the number of clusters 120, the eigenvalues, and the eigenvectors.

The clustering module 130 may include code and routines configured to enable a computing system to perform one or more operations. Additionally or alternatively, the clustering module 130 may be implemented using hardware including a processor, a microprocessor (e.g., to perform or control performance of one or more operations), a field-programmable gate array (FPGA), or an application-specific integrated circuit (ASIC). In some other instances, the clustering module 130 may be implemented using a combination of hardware and software. In the present disclosure, operations described as being performed by the clustering module 130 may include operations that the clustering module 130 may direct a corresponding system to perform. In some embodiments, the clustering module 130 may be configured to perform a series of operations with respect to the graph dataset 110, the eigenvalues, the eigenvectors, the clusters, and/or the Laplacian matrix as described in further detail below in relation to at least method 300 of FIG. 3 and method 400 of FIG. 4.

In some embodiments, the cost associated with the external edges included in a given cluster 140 may be measured mathematically according to Equation (1):

$$\text{Ratio Cut}_{P_j}(C_1, C_2, \ldots, C_k) = \sum_{i=1}^{k} \frac{\text{Cut}(P_j \cap C_i, V \setminus C_i)}{|C_i|} \quad (1)$$

The ratio cut quantity calculated in Equation (1) may represent a sum of the number and/or weights of external edges crossing from a given cluster, $C_j$, to other clusters, $Cut(C_i, V\backslash C_j)$, for a given graph dataset, $P_j$. In some embodiments, maintaining the same or similar costs between all of the clusters 140 may represent a social equitability of the clustering process; by avoiding overrepresentation of any particular nodes, each of the data points of the graph dataset 110 may be more equally represented overall. In these and other embodiments, a summation of the ratio cut results of each of the clusters 140 may be equal to the ratio cut result of the given graph dataset according to the following relationship:

$$\text{Ratio Cut}(C_1, C_2, \ldots, C_k) = \sum_{i=1}^{l} \text{Ratio Cut}_{P_j}(C_1, C_2, \ldots, C_k) \quad (2)$$

In some embodiments, determining how to organize the nodes of the graph dataset 110 into the clusters 140 may be facilitated by representing the graph dataset 110 in terms of the similarity between the nodes included in the graph dataset 110. As described above, for example, a degree of adjacency and/or a degree of connectivity between each of the nodes may be represented according to an adjacency matrix and/or a connectivity matrix, respectively. Additionally or alternatively, the similarity between the nodes may be modeled as a matrix representation of the graph dataset 110, such as the Laplacian matrix.

In some embodiments, a spectral decomposition of the Laplacian matrix may be used to determine the ratio cut quantity. In these and other embodiments, the ratio cut quantity as described in relation to Equation (2) may be related to the Laplacian matrix according to the following equation:

$$\text{Ratiocut}_{P_j}(C_1, C_2, \ldots, C_k) = Tr(H_j^T L H_j) \quad (3)$$

As indicated by Equation (3), the ratio cut quantity may be calculated as a product of the transpose of a matrix, $H_j$, denoting membership of one or nodes in a given cluster (the "membership matrix"), the Laplacian matrix, and the membership matrix.

The entries of the membership matrix may be represented as:

$$H_j \in \mathbb{R}^{n \times k} : H_j[i, l] = \frac{1}{|C_l|} \text{ if } i \in P_j \cap C_l, \text{ else } 0 \quad (4)$$

As indicated in Equation (4), the membership matrix, $H_j$, may be an n-by-k matrix in which n represents the number of nodes included in the graph dataset 110, and k represents the number of clusters. For a given node, i, that belongs to a given cluster, l, (e.g., $i \in P_j \cap C_l$) an entry of the membership matrix may be assigned a weight of $$\frac{1}{|C_l|}.$$

The entries of the membership matrix may otherwise be assigned a value of 0. Given that the membership matrix includes entries as defined by Equation (4), the ratio cut quantity may be computed as a combinatorial optimization problem.

Solving for the ratio cut quantity may be simplified from the combinatorial optimization problem to a spectral decomposition of the Laplacian matrix by applying the following set of identities to Equations (3) and (4):

$$H = \sum_{j=1}^{m} H_j \quad (5)$$

$$\langle H_j, H_{j'} \rangle = 0 \quad (6)$$

$$H^T H = \mathbb{1}_k \quad (7)$$

Applying the set of identities defined in Equations (5)-(7) to Equation (3) simplifies the combinatorial optimization problem into solving for the trace of the Laplacian matrix, which is then equivalent to spectrally decomposing the Laplacian matrix, to determine the cost associated with a given cluster 140.

Based on the spectral decomposition of the Laplacian matrix, the Laplacian matrix may be represented in terms of its eigenvalues and eigenvectors. In some embodiments, multiple eigenvalues and their corresponding eigenvectors associated with the Laplacian matrix may be selected, and a user may identify the number of clusters 120 into which the nodes of the graph dataset 110 may be categorized. Each eigenvalue-eigenvector pair may be separated into the clusters 140 such that a sum of the eigenvalues in each cluster 140 is the same or within a given tolerance range. In these and other embodiments, the eigenvectors corresponding to the eigenvalues separated into each of the clusters 140 may be treated as the columns of the membership matrix for the respective clusters 140. Furthermore, the sum of the eigenvalues for each respective cluster 140 may correspond to the trace function and the ratio cut quantity as defined in Equation (3) and based on the identities of Equations (5)-(7).

In some embodiments, a clustering algorithm may be applied to the membership matrices, H to associate each node of the graph dataset 110 with a respective cluster. For example, a k-means clustering algorithm (or any other vector quantization clustering algorithm) may be applied to the graph dataset 110 to identify centers for each of the respective clusters 140 and sort the nodes to the nearest cluster center.

Figure 2:
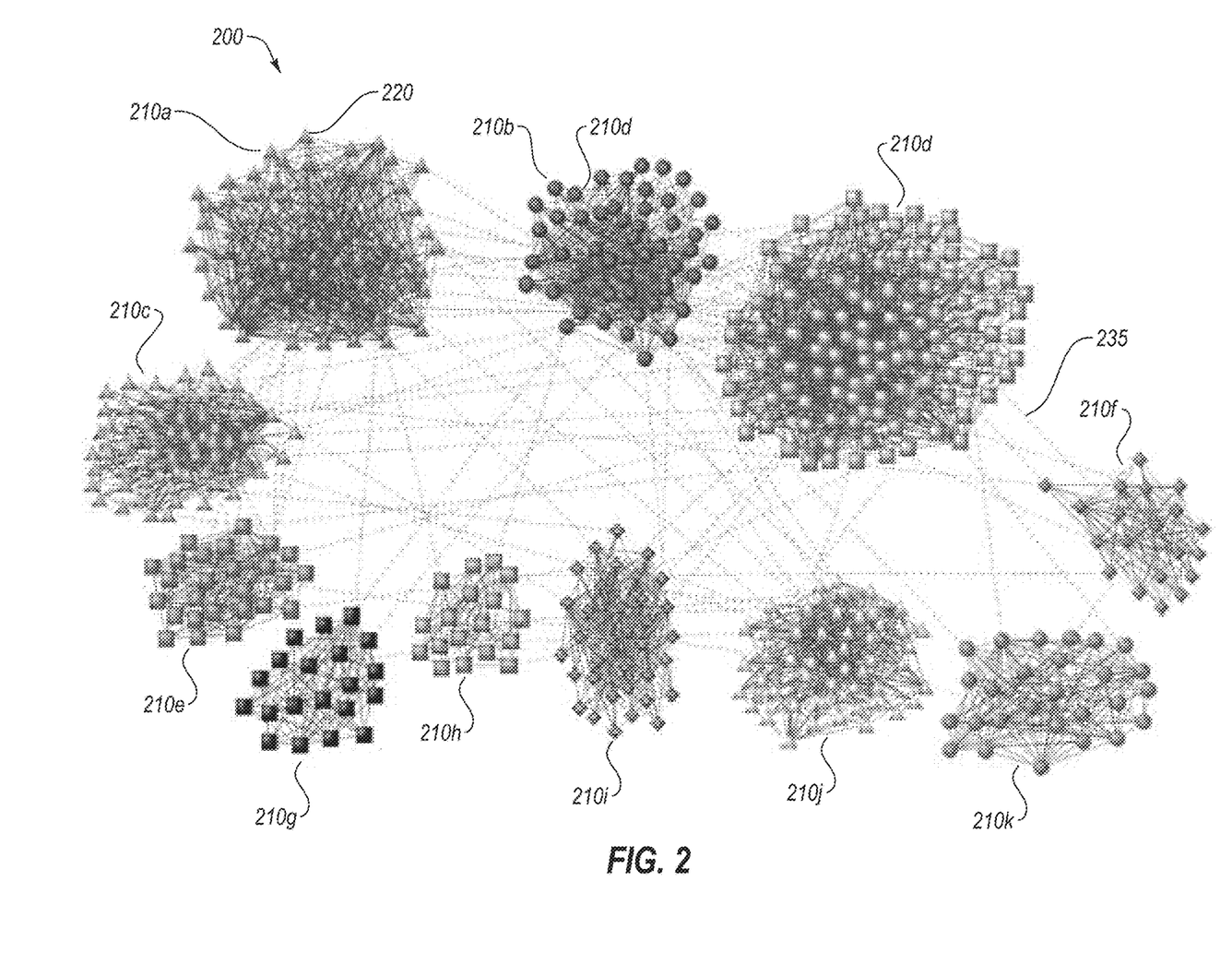
FIG. 2 illustrates an example of a graph dataset in which nodes of the graph dataset are clustered using cost equalized spectral clustering according to at least one embodiment of the present disclosure.

For example, FIG. 2 illustrates an example of a clustered graph dataset 200 in which nodes 220 of the graph dataset are clustered into various clusters 210a-210k using cost equalized spectral clustering according to at least one embodiment of the present disclosure. A number of clusters may be determined by a user, and the nodes 220 may be sorted into each of the clusters 210. Prior to being sorted into the clusters 210, each of the nodes 220 may include one or more edges 230 that connect each of the nodes 220 to other nodes. After sorting the nodes 220 into the clusters 210, the edges 230 between the nodes 220 may be the same as before sorting; as such, edges 230 internal to a given cluster may be formed and/or one or more external edges 235 that connect each of the nodes 220 to nodes in other clusters may also be formed. For example, a given node included in a first cluster 210a may include multiple edges 230 connecting to other nodes in the first cluster 210a.

Additionally or alternatively, the given node may include one or more external edges 235 connecting to nodes in a second cluster 210b, a third cluster 210c, a fourth cluster 210d, and/or any other clusters identified in the graph dataset 200. As illustrated in the clustered graph dataset 200, each of the clusters 210 includes approximately the same number of external edges 235 such that a cost associated with each of the clusters 210 is the same or within a predetermined tolerance limit (e.g., within an absolute threshold value, within a threshold percentage value of the highest cost or the lowest cost of the clusters, or within a predetermined cost range).

Returning to the description of FIG. 1, the nodes of the graph dataset 110 sorted into the clusters 140 according to the present disclosure may be used as inputs for a data analysis process. For example, a given graph dataset may describe relationships between registered users of a social media network; each of the nodes of the given graph dataset may represent a respective user of the social media network, and the edges between the nodes may represent connections between two or more registered users. One or more clusters set by an analyzing user may represent communities included in the social media network, and clustering the nodes of the graph dataset 110 according to the present disclosure may facilitate more cost equalized community detection by not overly representing any one or more given communities (i.e., prevent overrepresentation of any one cluster of the clusters 140). In particular, the cost equalized distribution of nodes within the clusters 140 may improve detection of insular communities and/or communities that include fewer members.

Additionally or alternatively, the clustered graph dataset 110 according to the present disclosure may be included in a dataset for training machine learning models. Because clustering of the nodes of the graph dataset 110 according to the present disclosure is more cost equalized than other similarity-function-based clustering models, the machine learning models trained using the clustered graph dataset 110 may be trained to apply cost equalized data analysis methods.

Modifications, additions, or omissions may be made to the system 100 without departing from the scope of the present disclosure. For example, the designations of different elements in the manner described is meant to help explain concepts described herein and is not limiting. For instance, in some embodiments, the clustering module 130 is delineated in the specific manner described to help with explaining concepts described herein but such delineation is not meant to be limiting. Further, the system 100 may include any number of other elements or may be implemented within other systems or contexts than those described.

Figure 3:
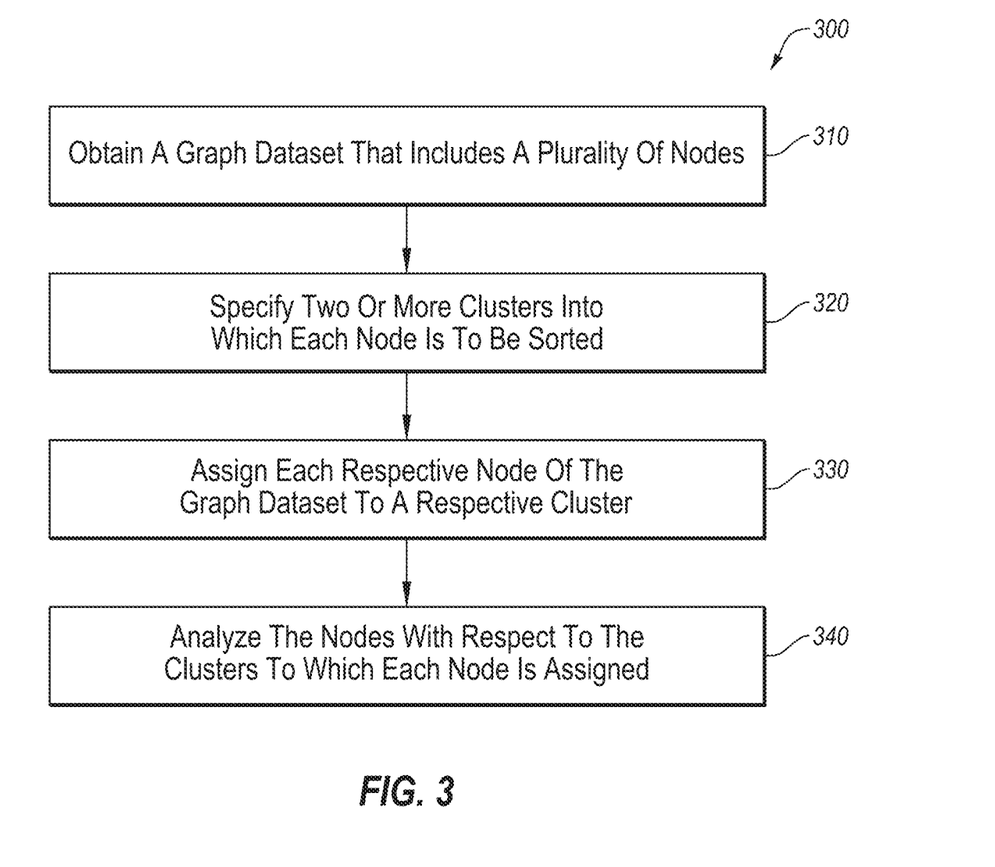
FIG. 3 is a flowchart of an example method of performing cost equalized spectral clustering according to at least one embodiment of the present disclosure.

FIG. 3 is a flowchart of an example method 300 of performing cost equalized spectral clustering according to at least one embodiment of the present disclosure. The method 300 may be performed by any suitable system, apparatus, or device. For example, the clustering module 130 may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 310 where a graph dataset that includes multiple nodes is obtained. Each of the nodes of the graph dataset may represent a data point, and edges connecting the nodes may represent relations between two or more data points included in the graph dataset.

At block 320, a number of clusters into which the nodes of the graph dataset may be sorted may be specified. In some embodiments, the number of clusters may be set by a user and/or data analysis software (e.g., a machine learning model) as described in relation to FIG. 1.

At block 330, each of the nodes may be assigned to a respective cluster. Each respective node may be assigned to a respective cluster according to the respective costs that are each associated with each of the respective clusters such that all of the costs are within a threshold value of each other. In some embodiments, the respective cost associated with its respective cluster may be determined based on the external edges connecting the respective nodes in the respective clusters to the nodes in each other cluster as described above. In some embodiments, assigning the nodes to their respective clusters according to the cost associated with each of the respective clusters may be facilitated by computing a Laplacian matrix, eigenvalues, and eigenvectors corresponding to the graph dataset and performing a k-means clustering algorithm as described in relation to FIG. 1 and as described in further detail below with respect to FIG. 4.

At block 340, the nodes of the graph dataset, the clusters, and/or the graph dataset may be analyzed with respect to the nodes assigned to the respective clusters. In some embodiments, the analysis of the nodes, the clusters, and/or the graph dataset may include a data analysis task such as the community detection described in relation to FIG. 1. Additionally or alternatively, the data analysis task may include training automated data analysis models, such as machine learning models, based on the nodes clustered in such a way to avoid overly representing one or more subsets of the graph dataset.

Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
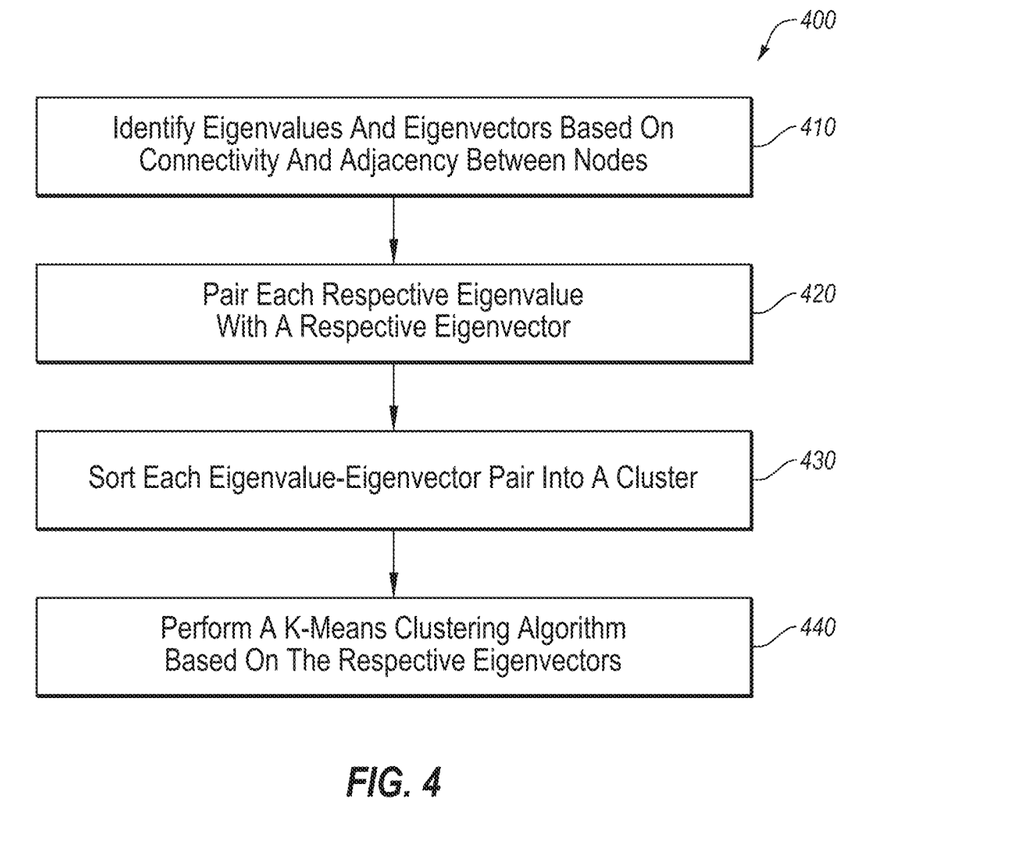
FIG. 4 is a flowchart of an example method of assigning nodes of the graph dataset to one or more clusters according to at least one embodiment of the present disclosure.

FIG. 4 is a flowchart of an example method 400 of assigning nodes of the graph dataset to one or more clusters according to at least one embodiment of the present disclosure. The method 400 may be performed by any suitable system, apparatus, or device. For example, the clustering module 130 may perform one or more operations associated with the method 400. In some embodiments, one or more operations of the method 400 may be performed as part of block 330 of the method 300. Although illustrated with discrete blocks, the steps and operations associated with one or more of the blocks of the method 400 may be divided into additional blocks, combined into fewer blocks, or eliminated, depending on the particular implementation.

The method 400 may begin at block 410, where one or more eigenvalues and one or more eigenvectors related to the graph dataset may be identified. In some embodiments, the graph dataset may be modeled as one or more matrices that describe one or more aspects of the nodes. For example, an adjacency matrix may represent the degree of adjacency between the nodes, and a connectivity matrix may represent the connections between the nodes via the corresponding edges of the nodes. As another example, a Laplacian matrix may represent features of the graph dataset. The eigenvalues and eigenvectors may be identified based on spectral decomposition of the matrices. For example, spectral decomposition of the Laplacian matrix as described in relation to FIG. 1 may yield multiple eigenvalues and eigenvectors corresponding to the Laplacian matrix and the graph dataset.

At block 420, each respective eigenvalue may be paired with a respective eigenvector to form eigenvalue-eigenvector pairs. Each eigenvalue identified at block 410 (e.g., via spectral decomposition of the Laplacian matrix) may correspond to an associated eigenvector. In some embodiments, pairing the eigenvalues with their corresponding eigenvectors may facilitate sorting corresponding eigenvalues and eigenvectors into the same cluster, such as described above.

At block 430, each of the eigenvalue-eigenvector pairs may be sorted into a cluster. In some embodiments, sorting the eigenvalue-eigenvector pairs into the clusters may occur as described in relation to FIG. 1. Additionally or alternatively, the number of eigenvalue-eigenvector pairs to be sorted into the clusters may be proportionate to the number of clusters specified at block 320 of the method 300. For example, the number of eigenvalue-eigenvector pairs selected for sorting at block 430 may be equal to, two times, three times, four times, or any other scalar factor of the number of clusters specified at block 320 of the method 300.

At block 440, a k-means clustering algorithm may be performed on respective matrices that includes the respective eigenvectors corresponding to the respective clusters. In some embodiments, performing the k-means clustering algorithm at block 440 may be a way to assign each of the nodes into a respective cluster at block 330 of the method 300.

Modifications, additions, or omissions may be made to the method 400 without departing from the scope of the disclosure. For example, in some embodiments, one or more operations of the method 400 may be performed after specifying the clusters into which each of the nodes is to be sorted at block 320 of the method 300. Additionally or alternatively, one or more operations of the method 400 may be performed before assigning each respective node of the graph dataset to a respective cluster. Further, the method 400 may include any number of other elements or may be implemented within other systems or contexts than those described.

Figure 5:
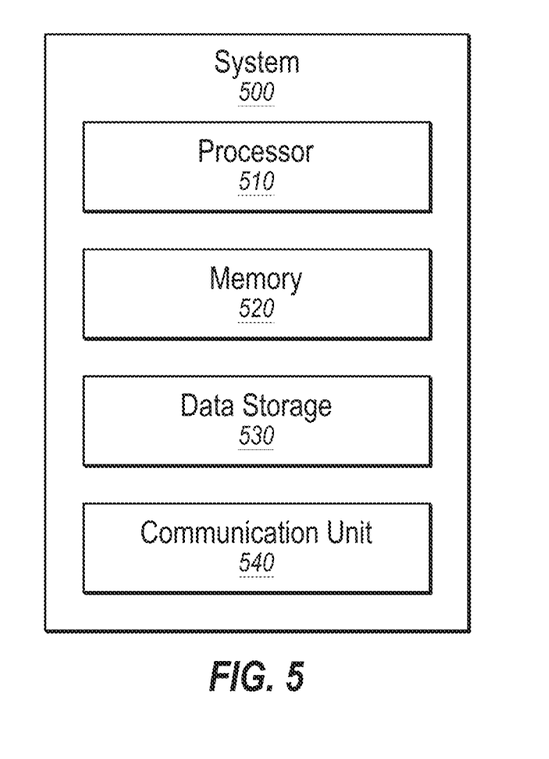
FIG. 5 is an example computing system.

FIG. 5 illustrates an example computing system 500, according to at least one embodiment described in the present disclosure. The computing system 500 may include a processor 510, a memory 520, a data storage 530, and/or a communication unit 540, which all may be communicatively coupled. Any or all of the system 100 of FIG. 1 may be implemented as a computing system consistent with the computing system 500, such as the clustering module 130.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to cause the computing system 500 to perform the operations of the method 300 of FIG. 3 and/or the method 400 of FIG. 4. For example, in response to execution of the instructions by the processor 510, the system 500 may obtain a graph dataset, specify two or more clusters into which nodes of the graph dataset may be sorted, assign each node to a respective cluster, and/or analyze the nodes, the clusters, and/or the graph dataset with respect to the respective cluster to which each of the respective nodes is assigned. As another example, the system 500 may, in response to execution of the instructions by the processor 510, identify eigenvalues and eigenvectors corresponding to a matrix representation of the graph dataset, identify eigenvalue-eigenvector pairs, sort the eigenvalue-eigenvector pairs into each of the clusters, and/or perform a k-means clustering algorithm on respective matrices that includes the respective eigenvectors corresponding to the respective clusters.

The memory 520 and the data storage 530 may include computer-readable storage media or one or more computer-readable storage mediums for having computer-executable instructions or data structures stored thereon. Such computer-readable storage media may be any available media that may be accessed by a general-purpose or special-purpose computer, such as the processor 510. For example, the memory 520 and/or the data storage 530 may store the nodes of the graph dataset 110, the user-determined clusters, and/or the clustered nodes of the graph dataset 110. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a certain operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    obtaining a graph dataset that includes a plurality of nodes;
    specifying two or more clusters into which each node of the plurality of nodes is to be sorted;
    assigning each respective node of the plurality of nodes of the graph dataset into a respective cluster of the two or more clusters according to respective costs that are each associated with each of the respective clusters such that all of the costs are within a threshold value of each other, the respective cost associated with its respective cluster is determined based on external edges connecting the respective nodes in the respective cluster to the nodes in each other cluster; and
    training a machine learning model to apply cost equalized data analysis methods as part of unsupervised learning performed by the machine learning model, the training including causing the machine learning model to analyze the plurality of nodes with respect to the respective cluster to which each of the respective nodes is assigned, the analyzing as part of the training causing a modification in the machine learning model that reduces bias of the machine learning model with respect to future processing by the machine learning model of data related to the graph dataset.

2. The method of claim 1, wherein assigning each respective node into the respective cluster according to the respective costs that are associated with each of the respective clusters comprises:
    identifying a plurality of eigenvalues and a plurality of eigenvectors in which each respective eigenvector of the plurality of eigenvectors corresponds to a respective eigenvalue of the plurality of eigenvalues, the plurality of eigenvalues and the plurality of eigenvectors being identified based on a degree of connectivity and a degree of adjacency between each node of the plurality of nodes;
    pairing respective eigenvalues of the plurality of eigenvalues with respective eigenvectors of the plurality of eigenvectors that correspond to the respective eigenvalues to form a plurality of eigenvalue-eigenvector pairs;
    sorting each of the eigenvalue-eigenvector pairs into the clusters such that the cost associated with each respective cluster, as determined based on the respective eigenvalues sorted into the respective cluster, is within a threshold value of the cost associated with each other cluster; and
    performing a k-means clustering algorithm on a respective matrix that includes the respective eigenvectors corresponding to the respective cluster.

3. The method of claim 2, wherein a number of eigenvalues and a number of eigenvectors included in the identified plurality of eigenvalues and the identified plurality of eigenvectors corresponds to the number of clusters into which the plurality of nodes is to be sorted.

4. The method of claim 2, wherein the cost associated with each of the clusters is determined by summing the respective eigenvalues sorted into each of the respective clusters.

5. The method of claim 4, wherein summing the respective eigenvalues sorted into each of the respective clusters is determined according to a ratio cut algorithm.

6. The method of claim 5, wherein the ratio cut algorithm includes computing a trace function of a product of a transpose of a matrix of the eigenvectors associated with each of the clusters "$H_j^T$", a Laplacian matrix "L", and the matrix of the eigenvectors associated with each of the clusters "$H_j$".

7. The method of claim 1, wherein:
each of the respective nodes of the plurality of nodes of the graph dataset describes a respective member of a social media network;
each of the clusters represent a community in which the members of the social media network are included; and
analyzing the plurality of nodes with respect to the respective cluster to which each of the respective nodes is assigned includes detection of one or more communities within the social media network.

8. One or more non-transitory computer-readable storage media configured to store instructions that, in response to being executed, cause a system to perform operations, the operations comprising:
obtaining a graph dataset that includes a plurality of nodes;
specifying two or more clusters into which each node of the plurality of nodes is to be sorted;
assigning each respective node of the plurality of nodes of the graph dataset into a respective cluster of the two or more clusters according to respective costs that are each associated with each of the respective clusters such that all of the costs are within a threshold value of each other, the respective cost associated with its respective cluster is determined based on external edges connecting the respective nodes in the respective cluster to the nodes in each other cluster; and
training a machine learning model to apply cost equalized data analysis methods as part of unsupervised learning performed by the machine learning model, the training including causing the machine learning model to analyze the plurality of nodes with respect to the respective cluster to which each of the respective nodes is assigned, the analyzing as part of the training causing a modification in the machine learning model that reduces bias of the machine learning model with respect to future processing by the machine learning model of data related to the graph dataset.

9. The one or more non-transitory computer-readable storage media of claim 8, wherein assigning each respective node into the respective cluster according to the respective costs that are associated with each of the respective clusters comprises:
identifying a plurality of eigenvalues and a plurality of eigenvectors in which each respective eigenvector of the plurality of eigenvectors corresponds to a respective eigenvalue of the plurality of eigenvalues, the plurality of eigenvalues and the plurality of eigenvectors being identified based on a degree of connectivity and a degree of adjacency between each node of the plurality of nodes;
pairing respective eigenvalues of the plurality of eigenvalues with respective eigenvectors of the plurality of eigenvectors that correspond to the respective eigenvalues to form a plurality of eigenvalue-eigenvector pairs;
sorting each of the eigenvalue-eigenvector pairs into the clusters such that the cost associated with each respective cluster, as determined based on the respective eigenvalues sorted into the respective cluster, is within a threshold value of the cost associated with each other cluster; and
performing a k-means clustering algorithm on a respective matrix that includes the respective eigenvectors corresponding to the respective cluster.

10. The one or more non-transitory computer-readable storage media of claim 9, wherein a number of eigenvalues and a number of eigenvectors included in the identified plurality of eigenvalues and the identified plurality of eigenvectors corresponds to the number of clusters into which the plurality of nodes is to be sorted.

11. The one or more non-transitory computer-readable storage media of claim 9, wherein the cost associated with each of the clusters is determined by summing the respective eigenvalues sorted into each of the respective clusters.

12. The one or more non-transitory computer-readable storage media of claim 11, wherein summing the respective eigenvalues sorted into each of the respective clusters is determined according to a ratio cut algorithm.

13. The one or more non-transitory computer-readable storage media of claim 12, wherein the ratio cut algorithm includes computing a trace function of a product of a transpose of a matrix of the eigenvectors associated with each of the clusters "$H_j^T$", a Laplacian matrix "L", and the matrix of the eigenvectors associated with each of the clusters "$H_j$".

14. The one or more non-transitory computer-readable storage media of claim 8, wherein:
each of the respective nodes of the plurality of nodes of the graph dataset describes a respective member of a social media network;
each of the clusters represent a community in which the members of the social media network are included; and
analyzing the plurality of nodes with respect to the respective cluster to which each of the respective nodes is assigned includes detection of one or more communities within the social media network.

15. A system comprising:
one or more processors; and
one or more non-transitory computer-readable storage media configured to store instructions that, in response to being executed, cause the system to perform operations, the operations comprising:
obtaining a graph dataset that includes a plurality of nodes;
specifying two or more clusters into which each node of the plurality of nodes is to be sorted;
assigning each respective node of the plurality of nodes of the graph dataset into a respective cluster of the two or more clusters according to respective costs that are each associated with each of the respective clusters such that all of the costs are within a threshold value of each other, the respective cost associated with its respective cluster is determined based on external edges connecting the respective nodes in the respective cluster to the nodes in each other cluster; and
training a machine learning model to apply cost equalized data analysis methods as part of unsupervised learning performed by the machine learning model, the training including causing the machine learning model to analyze the plurality of nodes with respect to the respective cluster to which each of the respective nodes is assigned, the analyzing as part of the training causing a modification in the machine learning model that reduces bias of the machine learning model with respect to future processing by the machine learning model of data related to the graph dataset.

16. The system of claim 15, wherein assigning each respective node into the respective cluster according to the respective costs that are associated with each of the respective clusters comprises:

identifying a plurality of eigenvalues and a plurality of eigenvectors in which each respective eigenvector of the plurality of eigenvectors corresponds to a respective eigenvalue of the plurality of eigenvalues, the plurality of eigenvalues and the plurality of eigenvectors being identified based on a degree of connectivity and a degree of adjacency between each node of the plurality of nodes;

pairing respective eigenvalues of the plurality of eigenvalues with respective eigenvectors of the plurality of eigenvectors that correspond to the respective eigenvalues to form a plurality of eigenvalue-eigenvector pairs;

sorting each of the eigenvalue-eigenvector pairs into the clusters such that the cost associated with each respective cluster, as determined based on the respective eigenvalues sorted into the respective cluster, is within a threshold value of the cost associated with each other cluster; and performing a k-means clustering algorithm on a respective matrix that includes the respective eigenvectors corresponding to the respective cluster.

17. The system of claim 16, wherein a number of eigenvalues and a number of eigenvectors included in the identified plurality of eigenvalues and the identified plurality of eigenvectors corresponds to the number of clusters into which the plurality of nodes is to be sorted.

18. The system of claim 16, wherein the cost associated with each of the clusters is determined by summing the respective eigenvalues sorted into each of the respective clusters.

19. The system of claim 18, wherein summing the respective eigenvalues sorted into each of the respective clusters is determined according to a ratio cut algorithm.

20. The system of claim 19, wherein the ratio cut algorithm includes computing a trace function of a product of a transpose of a matrix of the eigenvectors associated with each of the clusters "$H_j^T$", a Laplacian matrix "L", and the matrix of the eigenvectors associated with each of the clusters "$H_j$".

* * * * *